(12) United States Patent
Mu et al.

(10) Patent No.: US 11,683,598 B1
(45) Date of Patent: Jun. 20, 2023

(54) IMAGE SENSOR WITH ON-CHIP OCCLUSION DETECTION AND METHODS THEREOF

(71) Applicant: OMNIVISION TECHNOLOGIES, INC., Santa Clara, CA (US)

(72) Inventors: Bo Mu, San Jose, CA (US); Boyd Fowler, Sunnyvale, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/679,633

(22) Filed: Feb. 24, 2022

(51) Int. Cl.
*H04N 23/951* (2023.01)
*H04N 5/222* (2006.01)
*H04N 23/63* (2023.01)
*H04N 23/67* (2023.01)

(52) U.S. Cl.
CPC ......... *H04N 23/951* (2023.01); *H04N 5/2226* (2013.01); *H04N 23/634* (2023.01); *H04N 23/67* (2023.01)

(58) Field of Classification Search
CPC ............. H04N 5/23232; H04N 5/2226; H04N 5/232941; H04N 5/23212; H04N 23/951; H04N 23/634; H04N 23/67
See application file for complete search history.

(56) References Cited

U.S. PATENT DOCUMENTS

| | | | |
|---|---|---|---|
| 6,940,554 B2 | 9/2005 | Robins et al. | |
| 9,398,205 B2 | 7/2016 | Côté et al. | |
| 10,284,773 B2 * | 5/2019 | Pan | H04N 5/2351 |
| 2009/0290040 A1 * | 11/2009 | Du | H04N 5/20 348/222.1 |
| 2011/0221920 A1 * | 9/2011 | Gwak | H04N 5/232941 348/222.1 |
| 2012/0013708 A1 * | 1/2012 | Okubo | H04N 13/239 348/43 |
| 2014/0293079 A1 * | 10/2014 | Milanfar | H04N 5/2171 348/222.1 |
| 2014/0375835 A1 * | 12/2014 | Bos | H04N 5/23222 348/222.1 |
| 2015/0163400 A1 * | 6/2015 | Geiss | H04N 5/23229 348/231.99 |
| 2016/0004144 A1 * | 1/2016 | Laroia | H04N 5/2171 348/222.1 |
| 2017/0180637 A1 * | 6/2017 | Lautenbach | G08B 6/00 |
| 2019/0132530 A1 * | 5/2019 | Cheaz | H04N 5/357 |
| 2021/0406532 A1 * | 12/2021 | Qu | G06V 10/774 |

* cited by examiner

*Primary Examiner* — Timothy J Henn
(74) *Attorney, Agent, or Firm* — Christensen O'Connor Johnson Kindness PLLC (57) ABSTRACT

An imaging system including an image sensor coupled to a controller to image an external scene is described. The controller includes logic storing instructions that when executed causes the imaging system to perform operations including capturing images, including a first image and a second image, of an external scene, and generating reduced representations of the images including a first reduced representation associated with the first image and a second reduced representation associated with the second image. The operations further include comparing the first reduced representation with the second reduced representation to determine a difference between the first image and the second image and identifying an occurrence of an occlusion affecting the image sensor imaging the external scene when the difference is greater than a threshold value.

20 Claims, 6 Drawing Sheets

IMAGE SENSOR WITH ON-CHIP OCCLUSION DETECTION AND METHODS THEREOF

TECHNICAL FIELD

This disclosure relates generally to image sensors, and in particular but not exclusively, relates CMOS image sensors and applications thereof.

BACKGROUND INFORMATION

Image sensors have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, etc.) through both device architecture design as well as image acquisition processing.

The typical image sensor operates in response to image light reflected from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (i.e., image data) representing the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system, and method each related to occlusion detection affecting images captured by an image sensor are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Image sensors (e.g., one or more integrated circuits configured to generate an image, video, and/or point cloud representative of an external scene) rely on an optical pathway between the image sensor and the external scene such that the external scene may be imaged based on light incident upon the image sensor that is reflected or otherwise received from the external scene. However, when the optical pathway is impeded by an occlusion (e.g., dust, dirt, grime, mud, water, condensation, ice, snow, or any other foreign substance, contaminant, or object disposed proximate to the image sensor that impedes the image sensor from accurately imaging the external scene), light that would otherwise be incident upon the image sensor may be attenuated, reflected, diffracted, or otherwise blocked from reaching the image sensor, which results in obstruction of imaging. It is appreciated that occlusions may not necessarily reside directly on an image sensor itself, but that in some scenarios occlusions may be disposed on one or more optical components (e.g., lens, optical window, or the like) positioned between the image sensor and the external scene. The optical components may facilitate imaging of the external scene (e.g., by focusing light onto the image sensor, filtering light, or the like) and/or protect the image sensor from damage (e.g., an optically transparent glass or plastic window) and thus an obstruction present on the one or more optical components may also affect imaging of the external scene by the image sensor by inhibiting light from being incident upon the image sensor that would have otherwise reached the image sensor had there been no occlusion. It is further appreciated that an occlusion does not necessarily affect imaging of the entire external scene (i.e., the occlusion may not impede all light from reaching the image sensor such that the entire field of view of the image sensor is obstructed), but rather the occlusion may impede light from reaching one or more regions of the image sensor while not (or only partially) affecting other regions of the image sensor.

Due to the wide range of applications for image sensors the impact of an obstruction may range from an inconvenience to a serious safety concern. For example, an obstruction affecting image sensors used in autonomous driving applications could inhibit the vehicle from viewing its surroundings. Similarly, when an image sensor is utilized as a rear-view camera, a side-view mirror camera, or the like, an obstruction could prevent an operator of the vehicle from accurately viewing their surroundings. In such scenarios, the operator may not even be aware of the obstruction until they actively start viewing an output of the image sensor (e.g., viewing a display showing images output by the image sensor when making a turn, reversing, or the like). Accordingly, an automated way to determine whether an obstruction is affecting images being captured by an image sensor and alerting a user could mitigate the inconvenience and/or safety concerns resulting from the obstruction.

Described herein are embodiments of a system, apparatus, and method capable of detecting whether an obstruction is affecting images captured by an image sensor. In some embodiments, obstruction detection may be achieved by generating reduced representations of images being captured continuously or otherwise, comparing the reduced representations to determine whether there is a difference between temporally adjacent or near image frames (e.g., consecutive image frames) indicative of a presence of an occlusion, and monitoring subsequent images to determine whether the occlusion is stationary to provide verification of an occlusion presence. In the same or other embodiments, once a presence of an occlusion is verified, a notification (e.g., visual, audible, haptic, or otherwise) may be provided to an individual to alert the individual of the potential obstruction and/or of the degradation to the imaging system functionality resultant of the occlusion. In one or more embodiments, occlusion detection may be performed locally or on-chip. In other words, the image sensor may be an integrated circuit coupled to one or more processing elements (e.g., a controller such as a image signal processor, microprocessor, application specific integrated circuit, field programmable gate array, or the like) and logic (e.g., memory such as a buffer or other on-chip memory, which may correspond to static random access memory, dynamic random access memory, or other types of memory), which may be utilized in combination for occlusion detection. It is further appreciated that in some embodiments, occlusion detection may occur as part of image signal processing performed by the controller. In other words, the image signal processing pipeline, which may include Bayer transformation, demosaicing, noise reduction, interpolation, and the like may further include occlusion detection at any stage of image processing (e.g., before, after, or in parallel with any of Bayer transformation, demosaicing, noise reducing, interpolation, or other on-chip or off-chip computations). Advantageously, the embodiments of occlusion detection described herein may enable high-speed, low-power, and continuous occlusion detection, which may further provide convenience and/or safety benefits.

Figure 1:
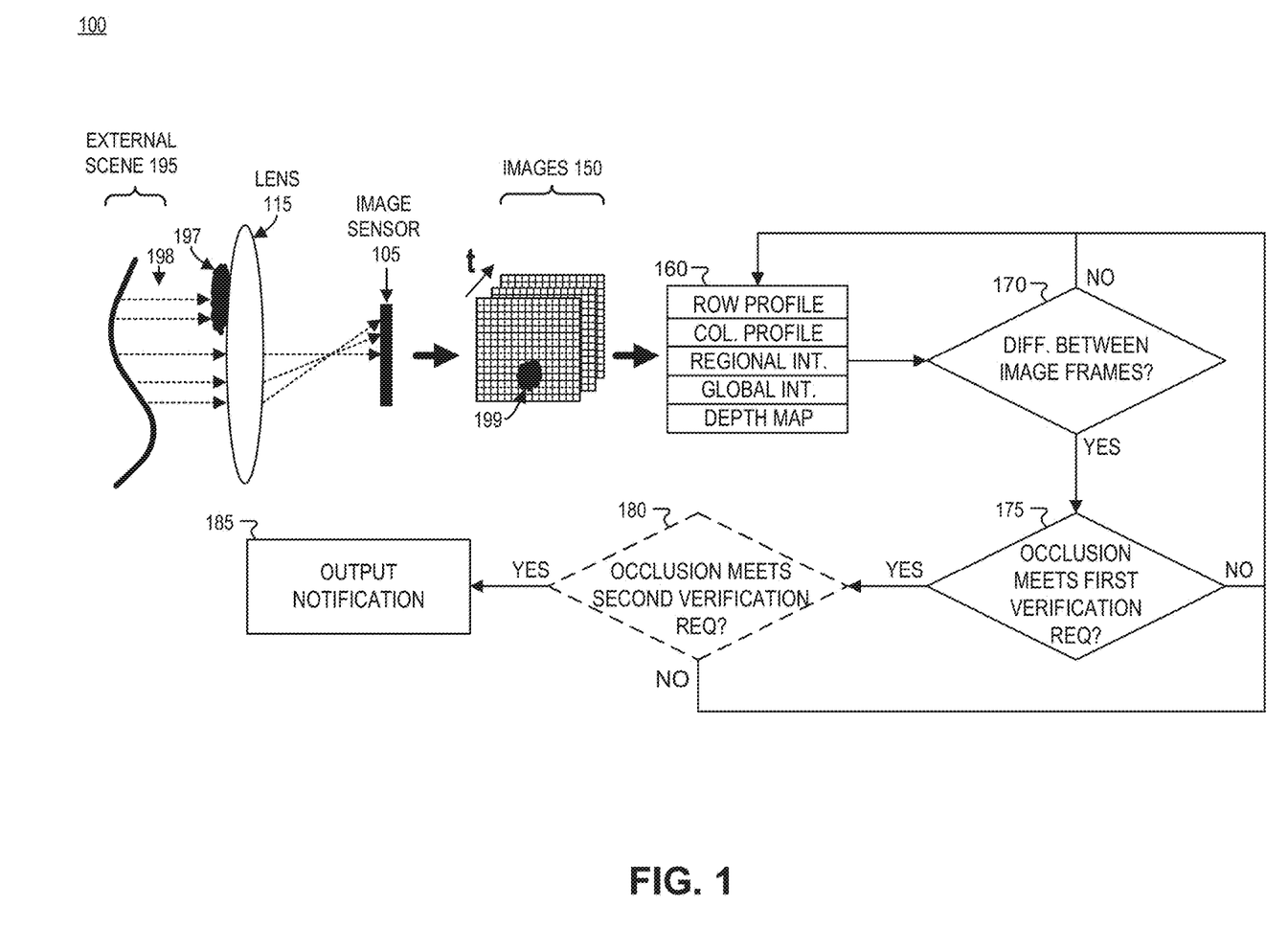
FIG. 1 illustrates an example method for detecting whether an occlusion is affecting images captured by an image sensor, in accordance with the teachings of the present disclosure.

FIG. 1 illustrates an example method 100 for detecting whether an occlusion 197 is affecting images 150 captured by an image sensor 105, in accordance with the teachings of the present disclosure. The method 100 may include blocks 160, 170, 175, 180, and 185. It is appreciated that the numbered blocks of method 100, including blocks 160-185, may occur in any order and even in parallel. Additionally, blocks may be added to, or removed from, method 100 in accordance with the teachings of the present disclosure.

In the illustrated embodiment, the image sensor 105 is capturing images 150 over time (t) of an external scene 195 via lens 115. Lens 115 may correspond to one or more optical components optically coupled to the image sensor 105 for imaging the external scene 195 and/or protecting the image sensor 105. For example, the lens 115 may filter and/or focus light that is incident upon the image sensor 105 to facilitate imaging. As shown in FIG. 1, the occlusion 197 impedes light 198 from being incident on the image sensor 105 resulting in one or more artifacts 199 appearing on the images 150. It is appreciated that the term "artifact" or "artifacts" corresponds to any defect in images (e.g., the images 150) output by an image sensor (e.g., the image sensor 105) resultant from one or more obstructions (e.g., the obstruction 197). The artifact 199 may include, but is not limited to, any one of, or a combination of, blur, chromatic aberration, aliasing, noise, distortion, fringing, intensity defect, or any feature which appears in the images 105, but is not present in the external scene 195 when imaged and is caused, at least in part, by the occlusion 197.

While the images 150 of the external scene 195 are being captured, recorded, and/or received, operations illustrated by blocks 160-185 of the method 100 may be performed. It is appreciated that blocks 160-185 may be performed in real-time (e.g., while a vehicle is autonomously or otherwise operating) with or without operator (e.g., driver, occupant of the vehicle, or otherwise) initialization and/or performed offline (i.e., not in real-time). In some embodiments, occlusion detection achieved by the method 100 may be continuously performed without operator input. For example, monitoring of a presence of occlusions may occur continuously in the background while the vehicle moves and if an occlusion is detected the operator or occupant is informed by a notification. In the same or other embodiments, occlusion detection may be enabled and/or disabled based on operator input (e.g., via one or more controller interfaces, input buttons, voice commands, or the like).

Block 160 shows that in response to the images 150 being captured (e.g., saved to on-chip or off-chip memory) by the image sensor 105 or otherwise received, reduced representations of the images 150 (e.g., individually or otherwise) are generated. Described herein, a reduced representation of an image refers to relative data size or resolution. In other words, if a first image included in the images 150 has a first resolution, then a first reduced representation associated with the first image has a corresponding resolution less than a full-size resolution (i.e., the first resolution) of the first image. Similarly, if a second image included in the images 150 has a second resolution (typically, but not necessarily equal to the first resolution), then a second reduced representation associated with the second image has a corresponding resolution less than a full-size resolution (i.e., the second resolution) of the second image. In some embodiments, the reduced representations have a common resolution (e.g., the corresponding resolutions of the first reduced representation and the second reduced representation are equal).

It is appreciated that resolution refers to the number of data values or pixels in a given image (e.g., a 100×100 array of pixels may have 10,000 pixels and each pixel may be associated with a respective color depending on the color filter pattern associated with the image sensor which captured the images). In some embodiments, the full-sized resolution of the given image may be many times greater than the corresponding resolution of the reduced representation. In some embodiments, the full-size resolution of the images 150 may be 5, 10, 50, 100, 1000, or more times greater than the corresponding resolution of the reduced representations of the images 150. For example, a reduced representation generated from an image captured by an image sensor with a 1000×1000 pixel array may have a corresponding resolution of 1000 data values (e.g., a 1000× reduction in resolution relative to the full-size resolution). Advantageously, the significant reduction in resolution may facilitate on-chip processing of occlusion detection.

As illustrated in FIG. 1, processes block 160 includes generating the reduced representations of the images 150, which may include, but is not limited to, one or more row profiles of the images 150, one or more column profiles of the images 150, one or more regional intensity values of the images 150, one or more global intensity values of the images 150, or one or more depth maps of the images 150. Additionally, or alternatively, the reduced representations of the images 150 may include one or more regional color intensity values of the images 150, one or more global color intensity values of the images 150, one or more diagonal profiles of the images 150, or any other metric in which a reduced representation of the images 150 can be generated and compared (e.g., respective values of different reduced representations are representative of common regions of the image sensor). In one embodiment where the reduced representations includes row profiles of the images 150, the first value of a first row profile associated with a first image (e.g., averaged intensity values for a first row of the first image) and a first value of a second row profile associated with a second image (e.g., averaged intensity values for a first row of the second image) are both representative of a common row (i.e., the first row) of the first and second images. In other words, the reduced representations provide regional information comparable across images to facilitate determining whether one or more occlusions (e.g., the occlusion 197) is affecting images (e.g., the images 150).

It is appreciated that the image sensor 105 includes an array of pixels arranged in columns and rows (see, e.g., FIG. 5), such that the images 150 are represented by pixel values that are also arranged in columns and rows to be representative of the external scene 195. Additionally, pixel values may be read out from the image sensor or its corresponding circuitry on a row-by-row or column-by-column basis, which may facilitate on-chip generation of reduced representations when the reduced representations include row profiles and/or column profiles.

As described herein, a row profile corresponds to a reduced representation of a given image with each value of the row profile representative of an individual row of the given image. For example, a first value of a first row profile of the given image may be representative of a first row of the given image. The first value may be an average intensity of the first row of the given image. It is appreciated that "average" may correspond to the arithmetic mean, geometric mean, median, mode, or other type of average. It is further appreciated that in some embodiments, outlier values may be removed (e.g., due to a hot or dead pixel, oversaturation, or the like) when generating the reduced representation. It is appreciated that generally a row profile is representative of an individual image. However, in some embodiments the row profile may be representative of more than one image. It is further appreciated that intensity of a given pixel in a given row of a given image may correspond to a pixel value associated with the given pixel (e.g., a digitized value representative of the intensity of light incident upon the given pixel) when capturing the given image. In some embodiments, only pixel values associated with a certain color (e.g., any one of red, green, or blue, cyan, magenta, yellow, black, or other color depending on the color space of the image and/or color filter pattern of the image sensor) may be used to generate the row profiles. In one embodiment, the row profiles may be based on each pixel in a given row regardless of color association. In one embodiment, only pixel values associated with green pixels may be utilized to generate row profiles. In the same or other embodiments, values from other color pixels or values from a combination of color pixels may be utilized to generate row profiles. For example, in one embodiment pixel brightness may be utilized to generate row profiles, which may be based on the combination of red, green, and blue color pixels.

In the same or another embodiment, a column profile corresponds to a reduced representation of a given image with each value of the column profile representative of an individual column of the given image. For example, a first value of a first column profile of the given image may be representative of a first column of the given image. The first value may be an average intensity of the first column of the given image. It is appreciated that "average" may correspond to the arithmetic mean, geometric mean, median, mode, or other type of average. It is further appreciated that in some embodiments, outlier values may be removed (e.g., due to a hot or dead pixel, oversaturation, or the like) when generating the reduced representation. It is appreciated that generally a column profile is representative of an individual image. However, in some embodiments the column profile may be representative of more than one image. It is further appreciated that intensity of a given pixel in a given column of a given image may correspond to a pixel value associated with the given pixel (e.g., a digitized value representative of the intensity of light incident upon the given pixel) when capturing the given image. In some embodiments, only pixel values associated with a certain color (e.g., any one of red, green, or blue, cyan, magenta, yellow, black, or other color depending on the color space of the image and/or color filter pattern of the image sensor) may be used to generate the column profiles. In one embodiment, the column profiles may be based on each pixel in a given column regardless of color association. In one embodiment, only pixel values associated with green pixels may be utilized to generate column profiles. In the same or other embodiments, values from other color pixels or values from a combination of color pixels may be utilized to generate column profiles. For example, in one embodiment pixel brightness may be utilized to generate column profiles, which may be based on the combination of red, green, and blue color pixels.

Additionally, or alternatively, the reduced representations of the images 150 may include profiles other than row or column profiles. For example, diagonal profiles in which the image sensor 105 and the images 150 are segmented into diagonal lines may also be utilized. Thus, an individual value from a diagonal profile of one of the images 150 may represent an average of pixel values for a given diagonal of the image. As discussed previously, "average" may correspond to the arithmetic mean, geometric mean, median, mode, or other type of average. It is further appreciated that in some embodiments, outlier values may be removed (e.g., due to a hot or dead pixel, oversaturation, or the like) when generating the reduced representation.

In the same or other embodiments, the reduced representations of the images 150 may include regional intensity, in which the image sensor 105 and the images 150 are divided into different regions (e.g., four quadrants or any other number of equally or unequally spaced regions that collectively cover the individual images 150). The intensity values of each of the regions may then be averaged (e.g., based on individual pixel values) to determine singular values (e.g., a scalar) for each of the regions. As discussed previously, the term "average" may correspond to the arithmetic mean, geometric mean, median, mode, or other type of average. It is further appreciated that in some embodiments, outlier values may be removed (e.g., due to a hot or dead pixel, oversaturation, or the like) when generating the reduced representation. Similarly, it is noted that regional intensity may be based on pixel values associated with individual colors or a combination of colors.

Similar to regional intensity, some embodiments include global intensity in the reduced representations of the images 150. As the name implies, global intensity corresponds to one or more singular values (e.g., scalars) representative of an entire image included in the images 150. In other words, the pixel values for the entire image may be averaged based on pixel color (e.g., one scalar for red pixels, one scalar for green pixels, and/or one scalar for blue pixels), brightness (e.g., a combination of pixel values for an adjacent group of pixels that include at least one red pixel, one green pixel, and one blue pixel), or combinations thereof. As discussed previously, the term "average" may correspond to the arithmetic mean, geometric mean, median, mode, or other type of average.

In the same or other embodiments, the reduced representations of the images 150 includes a depth map. The depth map may be based on information from two or more temporally adjacent images (e.g., consecutive) and/or based on depth information generated by the image sensor 105 when capturing the image (see, e.g., FIG. 5). In other words, the depth map may indicate a relative change (e.g., difference in distance between consecutive image frames) or an absolute distance (e.g., distance associated with individual pixels of a given one of the images 150). The distance or change in distance may indicate distance from an object in the external scene, or in the case of the occlusion 197, the distance the occlusion 197 is from the image sensor 105. It is appreciated that the depth map may be generated based on a configuration of the image sensor 105. In some embodiments, the image sensor 105 may include phase detect pixels to generate depth information to form a depth map or may have a pixel structure in which adjacent photodiodes a share common microlens so pixel values from adjacent photodiodes may be utilized to determine depth information.

In some embodiments, after a reduced representation of at least two of the images 150 is generated, block 160 proceeds to block 170 in which the reduced representations of the at least two of the images 150 (e.g., a first reduced representation of a first image and a second reduced representation of a second image) are compared to determine whether there is a difference between the reduced representations significant enough to indicate a presence of an occlusion (e.g., the occlusion 197) affecting the images 150. For example, the first reduced representation associated with the first image included in the images 150 may be compared with the second reduced representation associated with the second image included in the images 150 to determine whether there is a difference between the first image and the second image significant enough to indicate whether there is an occlusion affecting the images 150.

The difference may be specific to the type of reduced representations being generated from the images 150. In the case of the reduced representations including row profiles and/or column profiles, individual values of a given row or column profile may be compared between reduced representations. A threshold value or range may then be set and if the associated values differ greater than the threshold value or are outside of the threshold range then the associated values may be considered different enough to indicate an occlusion presence. For example, if the first value of a first row profile (e.g., corresponding to a first reduced representation associated with the first image) differs from a first value of a second row profile (e.g., corresponding to a reduced representation associated with the second image) by more than the threshold value or is otherwise outside of the threshold range, then the difference may indicate a presence of an occlusion. Additionally, or alternatively, the number of values that differ when making the comparison between reduced representations may also provide an indication as to whether the difference is sufficient to indicate a presence of an occlusion. For example, the threshold value or range could include a threshold quantity of differing values. Thus, in some embodiments, if the reduced representations being compared differ by a greater quantity of values than the threshold quantity of values then there may be an indication that an occlusion is affecting the images 150. For example, if twenty different pairs of values (e.g., any combination of the first value, second value, third value, and so on) of the first row profile and the second row profile differ by an amount greater than the threshold value and the threshold quantity is less than twenty, then the comparison may indicate that an occlusion is affecting the images 150. In other words, based on the comparison between the first reduced representation with the second reduced representation, an occurrence of an occlusion affecting the image sensor 105 imaging the external scene 195 and/or the images 150 may be identified when the difference is greater than a threshold value or is otherwise outside of a threshold range.

It is appreciated that in the same or other embodiments other reduced representations may be compared individually or in combination (e.g., regional intensity, global intensity, depth map, diagonal intensity, and the like) to determine whether there is a difference between reduced representations significant enough to indicate a presence of an occlusion affecting the images 150. For example, regional intensity may be compared between different images and when an abrupt change occurs (e.g., there is a difference greater than a threshold value or range) then there may be an indication that an occlusion is affecting the images 150. In some embodiments, an occlusion may not be identified until two or more of the types of reduced representations indicate a presence of an occlusion affecting the images 150. In one embodiment, for example, an occlusion may be identified if both row profile and column profile comparisons have a difference greater than a corresponding threshold value or range.

Generally, it is appreciated that block 170 determines whether there is an abrupt change in a group of two or more temporally adjacent (e.g., consecutive) images included in the images 150, which may be indicative of an occlusion affecting the images 150. If a difference between the group of two or more temporally adjacent images (e.g., the first image and the second image) is not found then block 170 proceeds to block 160 in which the next image may be captured or received and the comparison process continues in sequence or parallel. If there is a difference between the group of two or more temporally adjacent images, then block 170 proceeds to block 175 in which a first verification check is completed to verify the presence of the occlusion. In other words, block 175 illustrates performing a first verification check to verify whether the occlusion (e.g., one or more occlusions such as the occlusion 197) is affecting images (e.g., the images 150) captured by an image sensor (e.g., the image sensor 105). In some embodiments, the first verification check includes identifying a location of the occlusion (e.g., based on where the difference between the reduced representations is greater than the threshold value or range) and subsequent images are monitored to determine whether the occlusion is stationary. For example, in embodiments where a vehicle is moving and there is an occurrence of an occlusion (e.g., the occlusion 197), the occlusion may correspond to a region where the images 105 is static or remain relatively unchanged, which may be utilized to verify the presence of the occlusion. If the occlusion does not meet the first verification requirements (e.g., the region of subsequent images associated with an identified location of the occlusion changes), then it may be assumed that there is not an occlusion present and block 175 proceeds to block 160.

However, in some embodiments, there may be an optional second verification check to determine whether the occlusion meets second verification requirements. In other words, if the first verification requirements are met in block 175 then block 175 may proceed to block 180, which illustrates performing a second verification check to verify whether the occlusion (e.g., one or more occlusions such as the occlusion 197) is affecting images (e.g., images 150) captured by an image sensor (e.g., image sensor 105). In one embodiment, the second verification check may utilize the depth map of the corresponding image included in the images 150 and a distance of the occlusion from the image sensor 105 may be determined or otherwise inferred. If the distance of the occlusion from the image sensor 105 is less than a threshold distance, then the second verification requirements for the occlusion may be met and the occlusion presence considered to be verified for a second time. If the occlusion does not meet the second verification requirements, then block 180 may proceed to block 160 for the occlusion detection process to continue in sequence or parallel.

If the second verification requirements are met, then block 180 proceeds to block 185. In an alternative embodiment where block 180 is omitted, block 175 may proceed to block 185 when the occlusion meets the first verification requirements. Block 185 shows outputting a notification (e.g., visual, audible, haptic, or otherwise) indicating that an occurrence of an occlusion (e.g., the occlusion 197) has been verified and that the occlusion may impede the view of the external scene 195 associated with the images 150 captured by the image sensor 105. In some embodiments, the notification may correspond to a warning notification that is shown on a display included in the system (e.g., a display integrated into the dashboard of the vehicle). In the same or other embodiments, one or more actions or operations (e.g., safely pull over and/or stop the vehicle when the vehicle is autonomous) may be performed by a system (e.g., a vehicle or otherwise) in response to the occlusion (e.g., the occlusion 197) being detected and verified.

Figure 2:
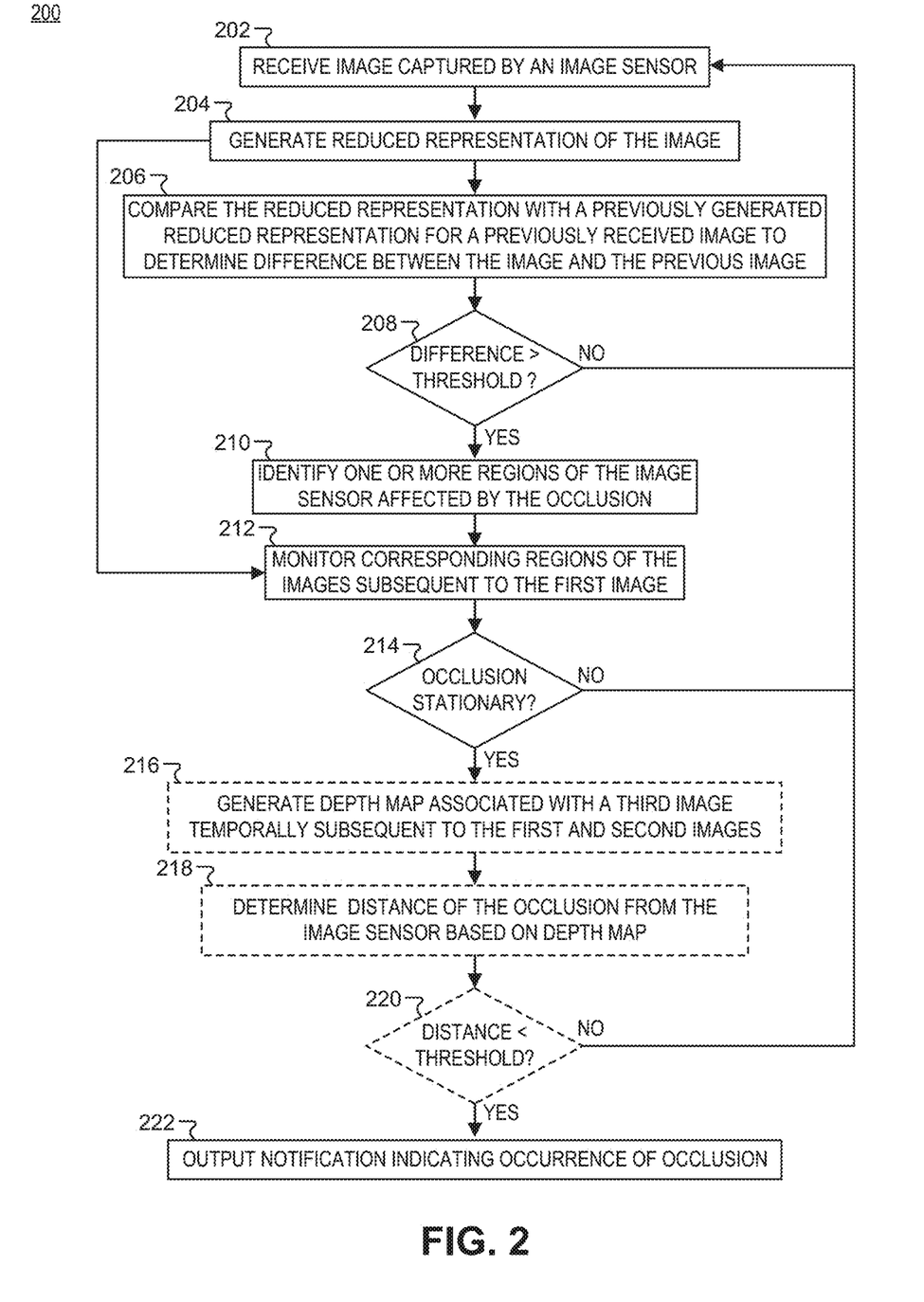
FIG. 2 illustrates another example method for detecting whether an occlusion is affecting images captured by an image sensor, in accordance with the teachings of the present disclosure.

FIG. 2 illustrates example method 200 for detecting whether an occlusion is affecting images captured by an image sensor, in accordance with the teachings of the present disclosure. Method 200 is one possible implementation of the method 100 illustrated in FIG. 1. The method 200 illustrated in FIG. 2 may include blocks 202, 204, 206, 208, 210, 212, 214, 216, 218, 220, and 222. It is appreciated that the numbered blocks of method 200, including blocks 202-222, may occur in any order and even in parallel. Additionally, blocks may be added to, or removed from, method 200 in accordance with the teachings of the present disclosure. It is appreciated that each loop of the method 200 may be for analyzing one or more images (e.g., comparing temporally adjacent or consecutive images), which may be performed in real time. Similarly, multiple loops of the method 200 may occur simultaneously (e.g., in parallel) or sequentially as images are received. More generally, the blocks of method 100 illustrated in FIG. 1 and method 200 illustrated in FIG. 2 may correspond to operations for occlusion detection, which may be stored as instructions within one or more non-transitory machine-accessible storage mediums that when executed by a machine (e.g., a vehicle, an imaging system, or otherwise) will cause the machine to perform the operations for occlusion detection.

Block 202 shows receiving images of an external scene captured by an image sensor. In some embodiments the images include at least a first image and a second image. In one embodiment, the first and second images are consecutive images in which the second image is temporally after the first image. However, in other embodiments, the first and second images may not be consecutive images. In other words, in some embodiments, there may be intervening images between the first image and the second image.

Block 204 illustrates generating reduced representations of the images. In some embodiments, each one of the reduced representations has a corresponding resolution less than a full-size resolution of a corresponding one of the images. In the same or other embodiments, the reduced representations include a first reduced representation associated with the first image and a second reduced representation associated with the second image. It is appreciated that block 204 may be analogous to block 160 of method 100 illustrated in FIG. 1. In other words, the reduced representations of block 204 may include or otherwise correspond to any one of the reduced representations discussed in reference to block 160 of FIG. 1 or combinations thereof.

Referring back to FIG. 2, block 204 includes generating reduced representations of one or more images received in block 202. The reduced representations may include, but are not limited to, one or more row profiles of one or more images, one or more column profiles of the one or more images, one or more regional intensity values of the one or more images, one or more global intensity values of the one or more images, or one or more depth maps of the one or more images. Additionally, or alternatively, the reduced representations of the one or more images may include one or more regional color intensity values of the one or more images, one or more global color intensity values of the one or more images, one or more diagonal profiles of the one or more images, or any other metric in which a reduced representation of the one or more images can be generated and compared (e.g., respective values of different reduced representations are representative of common regions of the image sensor used to capture the one or more images).

In some embodiments the machine (e.g., capable of accessing the one or more non-transitory machine-accessible storage mediums) includes an image sensor including an array of pixels arranged in rows and columns to image the external scene. In the same or other embodiments, the reduced representations of the images include at least row profiles or column profiles of the images. In some embodiments the row profiles correspond to average row intensities on a row-by-row basis based on the rows of the array of pixels for each of the images. In the same or other embodiments, the column profiles correspond to average column intensities on a column-by-column basis based on the columns of the array of pixels for each of the images.

Block 206 shows comparing the reduced representation (e.g., the second reduced representation associated with the second image) with a previously generated reduced representation (e.g., the first reduced representation associated with the first image that is temporally before the second image) to determine a difference between the first image and the second image. It is appreciated that in some embodiments the difference between the first reduced representation and the second reduced representation may be indicative of a presence of an occlusion affecting the images or, more specifically, the image sensor capturing the images. As discussed previously the difference may be due to one or more artifacts in the images resulting from the occlusion that would otherwise not be present in the images. In some embodiments, the difference corresponds to a change in the average row intensities or the average column intensities between the first image and the second image.

Block 208 illustrates identifying an occurrence of an occlusion affecting imaging of the external scene when the difference is greater than a threshold value. More specifically, if the difference is greater than a threshold value or range then block 208 proceeds to block 210. However, if the difference is not greater than a threshold value or range then block 208 proceeds to block 202 (e.g., to receive a next image). It is appreciated that blocks 206 and 208 illustrated in FIG. 2 may be analogous to block 170 illustrated in FIG. 1. In other words, the comparing the reduced representations of block 206 to determine a difference and determining whether the difference is greater than a threshold value or otherwise outside of a threshold range of block 208 may include or otherwise correspond to any one of the techniques discussed in reference to block 170 of FIG. 1 or combinations thereof. It is appreciated that the difference determined from block 206 illustrated in FIG. 2 may be specific to the type of reduced representations being generated from the images (e.g., block 204). In one embodiment, the reduced representations include row profiles and/or column profiles with individual values of a given row or a column profile comparable between reduced representations. A threshold value or range may then be set as illustrated in block 208 and, if the associated values differ greater than the threshold value or are otherwise outside of the threshold range, then the associated values may be considered different enough to indicate an occurrence or presence of an occlusion. Additionally, or alternatively, the number of values that differ when making the comparison between reduced representations may also provide an indication as to whether the difference is sufficient to indicate a presence of an occlusion. In the same or other embodiments, other reduced representations may be compared individually or in combination (e.g., regional intensity, global intensity, depth map, diagonal intensity, and the like) to determine whether there is a difference between reduced representations significant enough to indicate a presence of an occlusion affecting the images.

Block 210 shows identifying one or more regions of the image sensor affected by the occlusion based on a location where the difference between the first image and the second image is greater than the threshold value. In general, once a difference that may be associated with a potential occlusion has been identified in one or more images, the location or region where the difference is located within the individual images may be utilized to identify the location of the image sensor being affected by the occlusion. In some embodiments, the location of the difference corresponds to specific rows or columns of the images where the difference is located, which then may be correlated to specific regions of the image sensor affected by the occlusion and subsequent images captured by the image sensor. In other words, if there is an occlusion affecting the images, then it would be expected for that occlusion to remain stationary. Thus, any artifacts that appear in the images due to the occlusion would expect to be temporally stagnant and be expected to also appear in more than one image included in the images (e.g., subsequent images to the first image and the second image). Once one or more regions of the images, or more specifically the image sensor, are identified as being affected by the occlusion, then block 210 will proceed to block 212.

Block 212 illustrates monitoring corresponding regions of the images subsequent to the first image and the second image to determine whether the occlusion is stationary over a period of time. It is appreciated that corresponding regions may be monitored directly or indirectly via the reduced representations generated in block 204. For example, if the difference between the first image and the second image identified in block 208 corresponds to one or more specific locations within their corresponding reduced representations (e.g., the first reduced representation and the second reduced representation), then those specific locations of the reduced representations generated for subsequent images may be monitored to determine whether the occlusion is stationary.

Block 214 shows verifying the occlusion is affecting the image sensor and subsequent images when the period of time that the occlusion is stationary is greater than a temporal threshold. For example, if the specific locations of the reduced representations remain relatively unchanged (e.g., below a threshold value or otherwise within a threshold range) for subsequent images to the first image and the second over at least the temporal threshold of time, then it is determined the occlusion meets first verification requirements (i.e., the occurrence of the occlusion is verified) and block 214 proceeds to block 216 or block 222. If the occlusion is determined to not be stationary for the temporal threshold, then block 214 proceeds to block 202. It is appreciated that blocks 210-214 may be one possible implementation of block 175 of the method 100 illustrated in FIG. 1.

Blocks 216-220 correspond to optional steps to determine whether the occlusion meets second verification requirements and thus are one possible implementation of block 180 illustrated in FIG. 1. Referring back to FIG. 2, blocks 216-220 provide an additional check to further increase the likelihood that the determination that the occlusion is affecting the images being captured with the image sensor is correct. However, it is appreciated that blocks 216-220 are optional and may be omitted in some embodiments (e.g., the image sensor does not support generation of a depth map or the first verification check associated with blocks 210-214 is deemed to be sufficient in determining occlusion occurrences).

Block 216 illustrates generating a depth map associated with a third image included in the images, wherein the third image is temporally subsequent to the first image and the second image. The depth map may be generated using one or more phase detect pixels (see, e.g., FIG. 5) or other techniques.

Block 218 shows determining a distance of the occlusion from the image sensor based on the depth map to further verify the occlusion is affecting the image sensor when the distance is less than a depth threshold. Specifically, the corresponding regions of the third image that are associated with the occlusion (e.g., the portions of the third image that are associated with the one or more regions of the image sensor affected by the occlusion identified in block 210) may be correlated to the depth map to determine the distance (e.g., relative or absolute distance) of the occlusion from the image sensor.

Block 220 illustrates that if the distance of the occlusion from the image sensor is less than a threshold distance or otherwise within a threshold distance range, then the second verification confirms the occurrence of the occlusion and block 220 proceeds to block 222. If the distance is greater than the threshold distance or otherwise outside of the threshold distance range, then the second verification indicates that there may not be an occlusion affecting the image sensor and block 220 proceeds to block 202.

Block 222 shows outputting a notification indicating, to a user of the imaging system, the presence of the occlusion affecting the image sensor. It is appreciated that block 222 is one possible implementation of block 185 illustrated in FIG. 1 and may include the same or similar features discussed in connection with the method 100 illustrated in FIG. 1. Referring back to FIG. 2, block 222 shows outputting the notification (e.g., visual, audible, haptic, or otherwise) indicating that an occurrence of the occlusion has been determined and verified (e.g., via block 214 and/or block 222) and that the occlusion may impede the view of the external scene associated with the images captured by the image sensor. In some embodiments, the notification may correspond to a warning notification that is shown on a display included in a system (e.g., a display integrated into the dashboard of the vehicle). In the same or other embodiments, one or more actions or operations (e.g., safely pull over and/or stop the vehicle when the vehicle is autonomous) may be performed by the system (e.g., a vehicle or otherwise) in response to the occlusion being detected and verified. In some embodiments an indication of the occlusion may be determined, verified, and the one or more regions affected by the occlusion stored to memory (e.g., one or more non-transitory machine-accessible storage mediums). In the same or another embodiment, block 222 may be omitted and a notification may not be output, but the occurrence of the occlusion and the corresponding location of the occlusion stored.

Figure 3A:
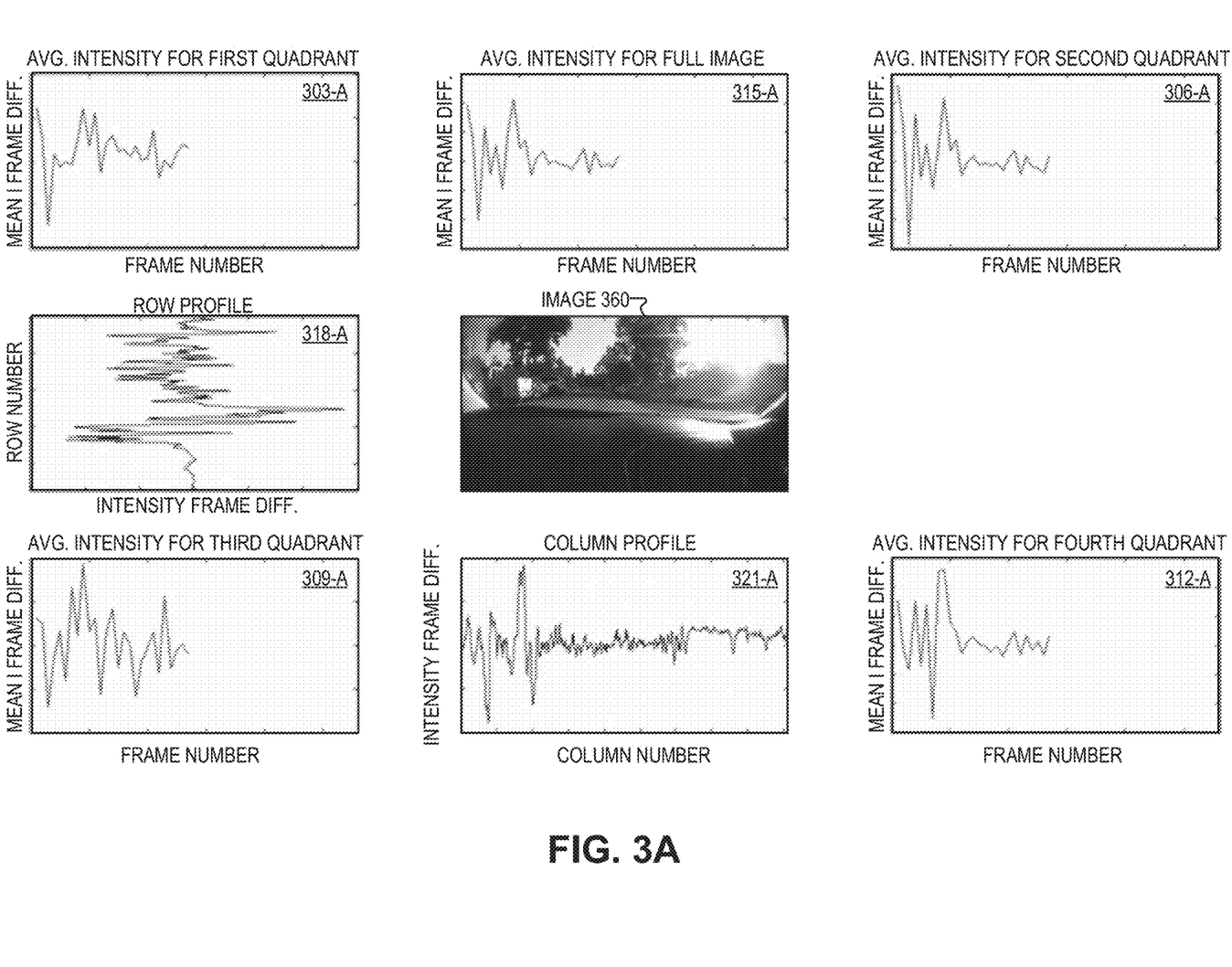
FIG. 3A illustrate example reduced representations of an image when there is not an occlusion affecting the image, in accordance with the teachings of the present disclosure.
Figure 3B:
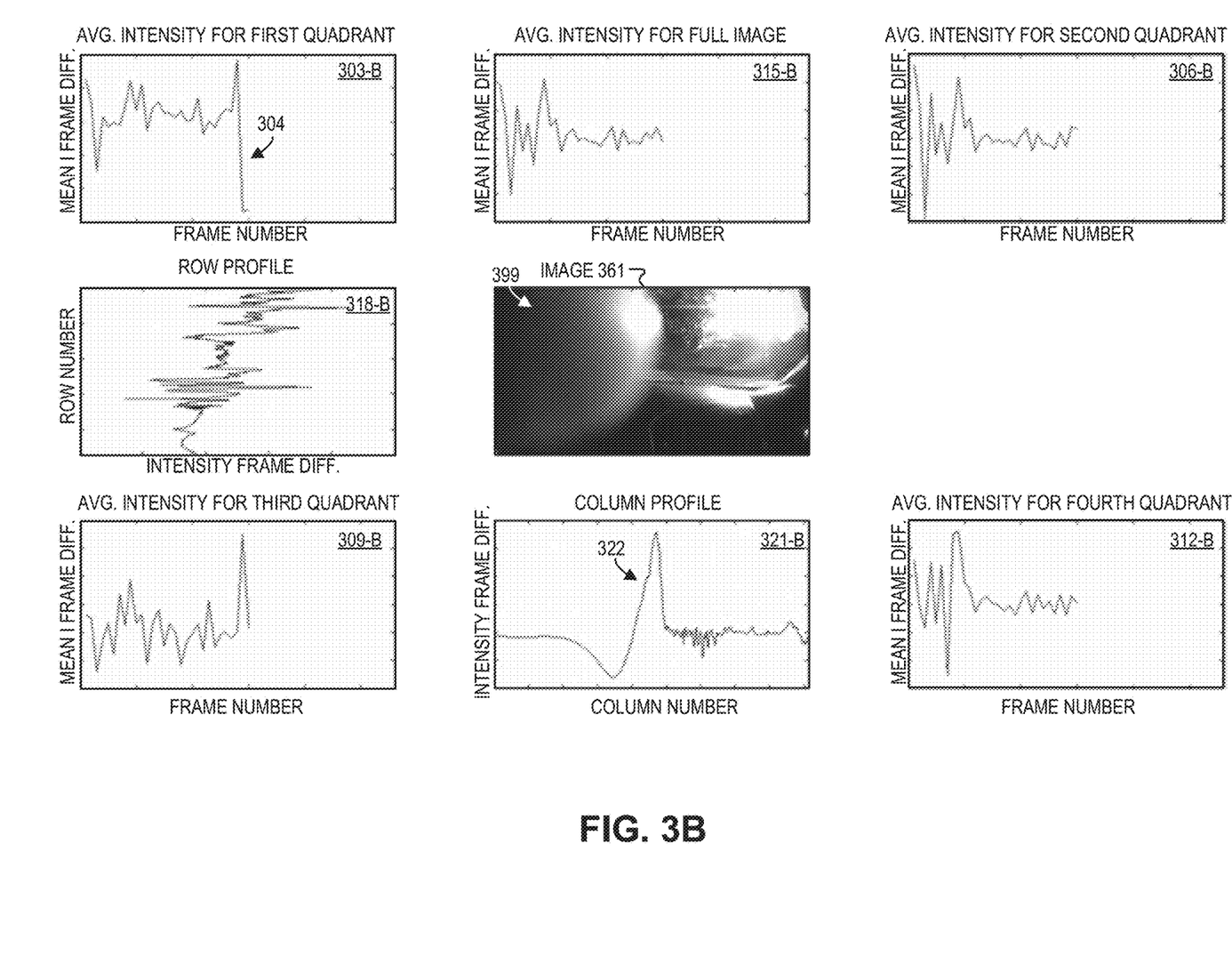
FIG. 3B illustrate example reduced representations of an image when there is an occlusion affecting the image, in accordance with the teachings of the present disclosure.

FIG. 3A and FIG. 3B respectively illustrated reduced representations of image 360 (e.g., a first image) and image 361 (e.g., a second image), which are possible implementations of the reduced representations generated in block 160 of method 100 illustrated in FIG. 1 and block 204 of method 200 illustrated in FIG. 2. Referring back to FIG. 3A and FIG. 3B, it is appreciated that the image 361 is temporally after the image 360. In some embodiments, the image 360 and the image 361 are consecutive images (e.g., there are no intervening images between the image 360 and the image 361). In other embodiments, the image 360 and the image 361 are non-consecutive (e.g., there are one or more intervening images between the image 360 and the image 361). One difference between the image 360 illustrated in FIG. 3A and the image 361 illustrated in FIG. 3B, is that there is an occlusion affecting the image 361 resulting in the artifact 399 appearing on the image 361 while image 360 does not include any artifacts resulting from an occlusion.

FIG. 3A illustrates example reduced representations 303-A, 306-A, 309-A, 312-A, 315-A, 318-A, and 321-A of the image 360 when there is not an occlusion affecting the image, in accordance with the teachings of the present disclosure. The reduced representation 318-A and 321-A illustrate a row and a column profile for the image 360, respectively. In this illustrated embodiment, the row or column profiles correspond to an intensity difference between the image 360 and a previously captured image (e.g., an earlier image that is temporally before the image 360, which may be an immediately prior image or otherwise) on a row-by-row or a column-by-column basis. In other words, the average intensity for each column or row is determined and compared between the image 360 and the previously captured image to determine the intensity frame difference with respect to row or column number. It is appreciated that in the illustrated embodiment, the reduced representations 318-A and 321-A are representative of an instantaneous change between images (e.g., there is no historical information associated with the reduced representations 318-A and 321-A for images that are temporally before the previously captured image).

In contrast, reduced representations 303-A, 306-A, 309-A, 312-A, and 315-A provide historical context to compare frame intensity difference with respect to frame number (e.g., a first frame corresponding to a first image, a second frame corresponding to a second image captured immediately or otherwise after the first image, a third frame corresponding to a third image captured immediately or otherwise after the second image, and so on). In other words, each point on the reduced representations 303-A, 306-A, 309-A, and 312-A correspond to the average (e.g., mean) intensity difference of a region of an individual frame compared to a corresponding region of an immediately prior frame. In the illustrated example, images are divided into quadrants (e.g., a first quadrant for 303-A, a second quadrant for 306-A, a third quadrant for 309-A, and a fourth quadrant for 312-A) and compared. The reduced representation 315-A corresponds to the average (e.g., mean) intensity for an entire image (e.g., the image 360) compared to a previously captured image (e.g., an immediately prior image).

FIG. 3B illustrates example reduced representations 303-B, 306-B, 309-B, 312-B, 315-B, 318-B, and 321-B of an image 361 when there is an occlusion affecting the image that results in the artifact 399, in accordance with the teachings of the present disclosure. The reduced representation 318-B and 321-B illustrate a row and a column profile for the image 361, respectively. In this illustrated embodiment, the row or column profiles correspond to an intensity difference between the image 361 and a previously captured image (e.g., the image 360, which may be an immediately prior image or otherwise) on a row-by-row or a column-by-column basis. In other words, the average intensity for each column or row is determined and compared between the image 361 and the image 360 to determine the intensity frame difference with respect to row or column number. It is appreciated that in the illustrated embodiment, the reduced representations 318-B and 321-B are representative of an instantaneous change between images (e.g., there is no historical information associated with the reduced representations 318-B and 321-B other than the image 360 and the image 361). As illustrated with the reduced representation 321-B, the column profile changes considerably in the presence of the artifact 399, which results in the peak 322 when comparing the image 361 to the image 360.

Reduced representations 303-B, 306-B, 309-B, 312-B, and 315-B provide historical context to compare frame intensity difference with respect to frame number (e.g., a first frame corresponding to a first image, a second frame corresponding to a second image captured immediately or otherwise after the first image, a third frame corresponding to a third image captured immediately or otherwise after the second image, and so on). In other words, each point on the reduced representations 303-B, 306-B, 309-B, and 312-B correspond to the average (e.g., mean) intensity difference of a region of an individual frame compared to corresponding region of an immediately prior frame (e.g., the image 361 compared to the image 360). In the illustrated example, images are divided into quadrants (e.g., a first quadrant for 303-B, a second quadrant for 306-B, a third quadrant for 309-B, and a fourth quadrant for 312-B) and compared. The reduced representation 315-B corresponds to the average (e.g., mean) intensity for an entire image (e.g., the image 361) compared to a previously captured image (e.g., the image 360). As illustrated, the drop 304 in the mean intensity frame difference of the reduced representation 303-B is due to the artifact 399 appearing in the image 361 due to an occlusion (e.g., the first quadrant corresponds to the top-left portion of the image 361 relative to the top-left portion of the image 360). It is appreciated that the second and fourth quadrants (e.g., top-right and bottom-right portions of the images) are generally not affected by the occlusion since the artifact 399 is positioned in the top-left portion of the image 360, which explains the lack of abrupt change in the reduced representations 306-B and 312-B.

Figure 4:
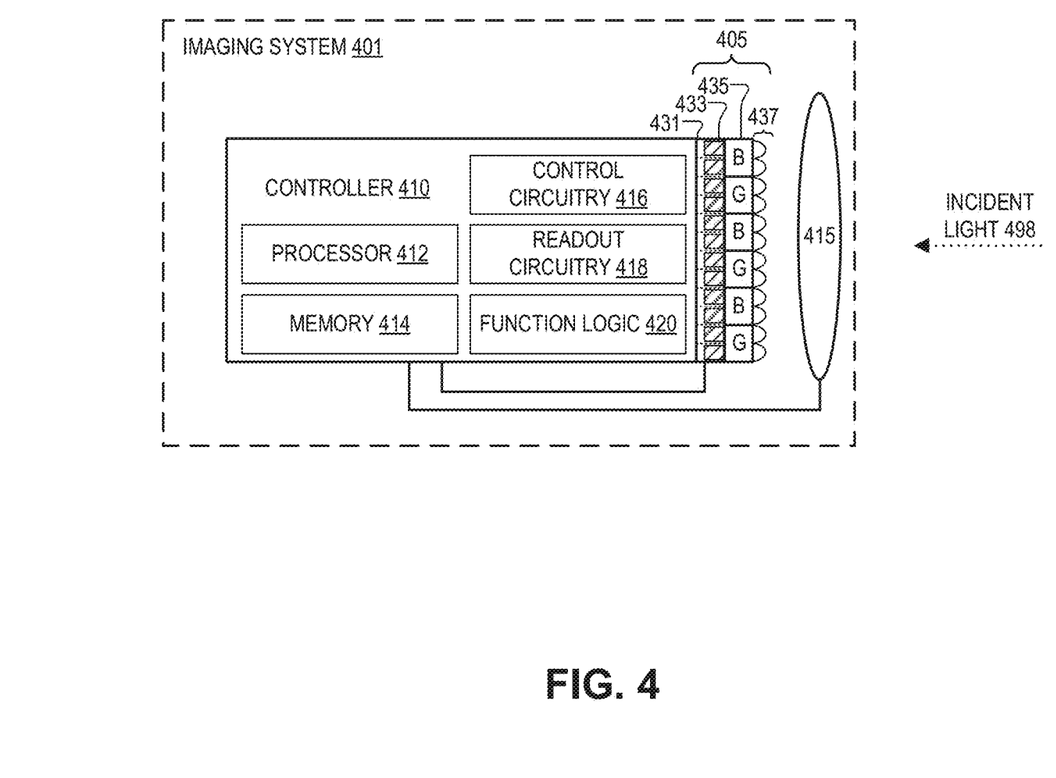
FIG. 4 is a functional block diagram of an imaging system including logic and/or memory for on-chip occlusion detection, in accordance with the teachings of the present disclosure.

FIG. 4 is a functional block diagram of an imaging system 401 for on-chip occlusion detection, in accordance with the teachings of the present disclosure. The imaging system 401 is one possible system that may implement the method 100 illustrated in FIG. 1, the method 200 illustrated in FIG. 2, or generate one or more of the reduced representations (e.g., 303-A, 306-A, 309-A, 312-A, 315-A, 318-A, 321-A, 303-B, 306-B, 309-B, 312-B, 315-B, 318-B, 321-B) illustrated in FIG. 3A and FIG. 3B, in accordance with the teachings of the disclosure. As illustrated, the imaging system 401 includes image sensor 405, controller 410, and lens 415. The image sensor 405 includes a semiconductor material 431 (e.g., a silicon substrate or wafer), a plurality of photodiodes 433, a plurality of color filters 435 (e.g., red, green, blue, or other color filters arranged over the plurality of photodiodes 433 to form one or more pixel cells that correspond to a full-color image pixel), and a plurality of microlenses 437 arranged to focus portions of the incident light 498 on individual photodiodes included in the plurality of photodiodes 433. It is appreciated that the plurality of photodiodes 433 may be arranged in rows and columns and aligned with the plurality of color filters 435 and the plurality of microlenses 437 to form an array of pixels also arranged in rows and columns to image an external scene in response to receiving the incident light 498.

The controller 410 includes logic and/or circuitry to control the operation (e.g., during pre-, post-, and in situ phases of image and/or video acquisition) of the various components of imaging system 401. The controller 410 may be implemented as hardware logic (e.g., application specific integrated circuits, field programmable gate arrays, system-on-chip, etc.), software/firmware logic executed on a general purpose microcontroller or microprocessor, or a combination of both hardware and software/firmware logic. In one embodiment, the controller 410 includes the processor 412 coupled to memory 414 that stores instructions for execution by the controller 410 or otherwise by one or more components of the imaging system 401. The instructions, when executed by the controller 410, may cause the imaging system 401 to perform operations that may be associated with the various functional modules, logic blocks, or circuitry of the imaging system 401 including any one of, or a combination of, control circuitry 416, readout circuitry 418, function logic 420, image sensor 405, lens 415 (e.g., an objective lens with one or more optical components that may be adjusted to provide variable focus), and any other element of the imaging system 401 (illustrated or otherwise).

The memory 414 is a non-transitory machine-accessible (e.g., computer-readable) medium that may include, without limitation, a volatile (e.g., RAM) or non-volatile (e.g., ROM) storage system accessible/readable by controller 410.

In some embodiments, the machine capable of accessing the non-transitory machine-accessible medium corresponds to the imaging system 401 (e.g., the controller 410 coupled to the image sensor 405). In the same or other embodiments, the non-transitory machine-accessible storage medium corresponds to on-chip memory (e.g., memory 414 and/or function logic 420) of the machine (e.g., the imaging system 401 or components thereof) to locally identify an occurrence of one or more occlusions without external memory or external processing (e.g., memory or processing components external to the controller 410). It is further appreciated that the controller 410 may be a monolithic integrated circuit, one or more discrete interconnected electrical components, or a combination thereof. Additionally, in some embodiments the one or more electrical components may be coupled to one another to collectively function as the controller 410 for orchestrating operation of the imaging system 401 (e.g., capturing one or more images, performing any one of or a combination of the method 100 illustrated in FIG. 1, the method 200 illustrated in FIG. 2, and/or generating the reduced representations illustrated in FIG. 3A or FIG. 3B). In some embodiments, the controller 410, or more specifically processor 412, corresponds to an image signal processor to provide image signal processing (e.g., Bayer transformation, demosaicing, noise reduction, interpolation, and the like) and may further include occlusion detection at any stage of image processing (e.g., before, after, or in parallel with any of Bayer transformation, demosaicing, noise reducing, interpolation, or other on-chip or off-chip computations) based on instructions stored in the memory 414. In the same or other embodiments, the memory 414 corresponds to on-chip memory (e.g., a buffer or otherwise) and the controller 410 provides on-chip processing. In some embodiments, the controller 410 and the image sensor 405 are part of a monolithic integrated circuit where one or more substrates or wafers may be stacked. In other embodiments, the controller 410 and the image sensor 405 may be discrete components that are physically separated from one another (e.g., positioned at different locations within a circuit board or otherwise) and coupled via one or more electrical connections (e.g., via one or more electrical traces).

Control circuitry 416 may control operational characteristics of the imaging system 401 (e.g., exposure duration, when to capture digital images or videos, and the like). Readout circuitry 418 reads or otherwise samples the analog signal from the individual photodiodes (e.g., read out electrical signals generated by each of the plurality of photodiodes 433 that are representative of image charge generated in response to incident light to generate a phase detection signal, read out image signals to capture an image frame or video, and the like) and may include amplification circuitry, analog-to-digital (ADC) circuitry, image buffers, or otherwise. In the illustrated embodiment, readout circuitry 418 is included in controller 410, but in other embodiments readout circuitry 418 may be separate from the controller 410. Function logic 480 is coupled to the readout circuitry 418 to receive the electrical signals to generate a phase-detection signal in response, generate an image in response to receiving image signals or data, and the like. In some embodiments, the electrical or image signals may be respectively stored as a phase detect signal or image data and may be manipulated by the function logic 420 to perform operations (e.g., calculate an expected image signal, bin image signals, demosaic the image data, apply post image effects such as crop, rotate, remove red eye, adjust brightness, adjust contrast, detect a presence of an occlusion, or otherwise).

Figure 5:
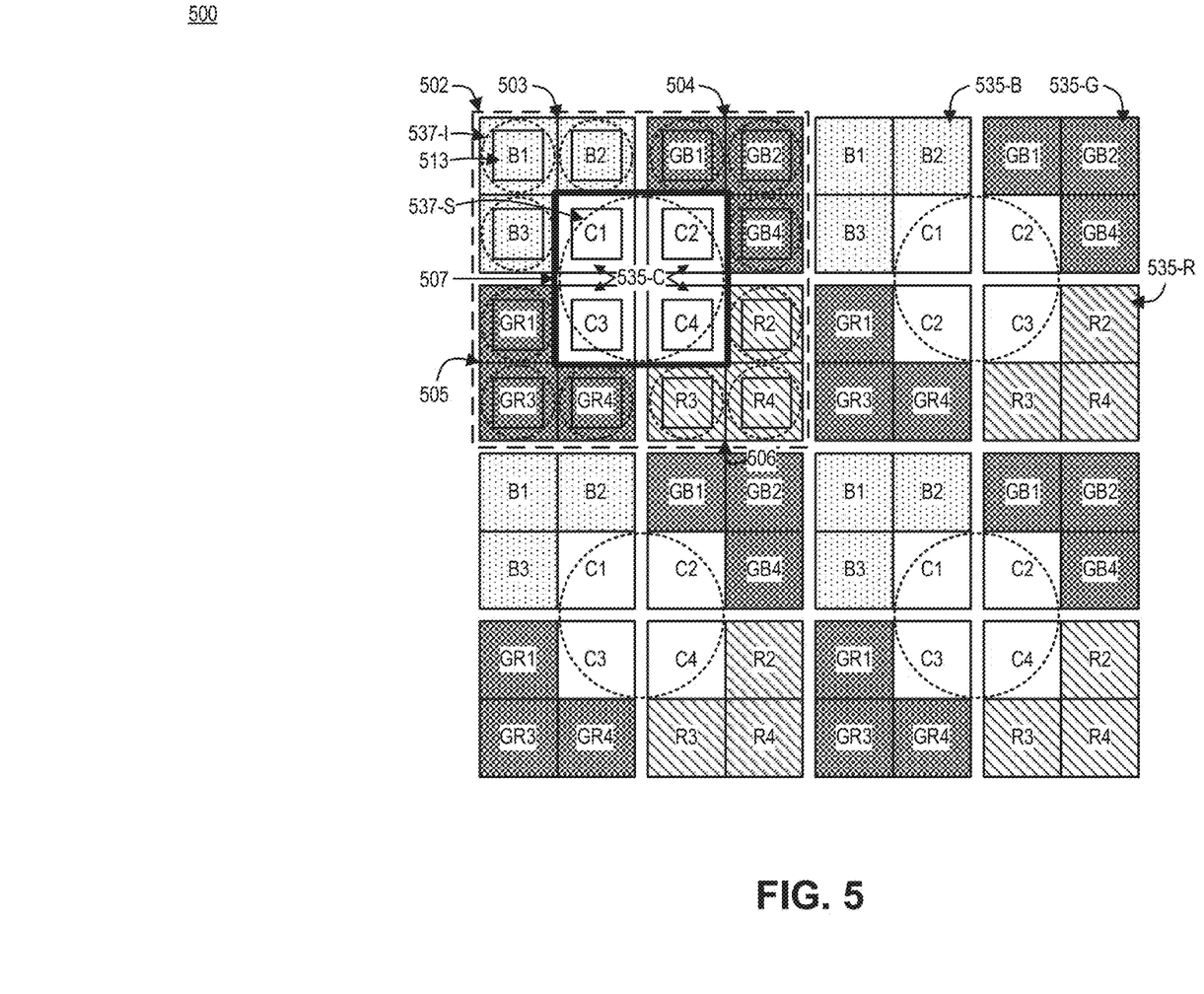
FIG. 5 illustrates atop view of an example image sensor capable of generating a depth map for occlusion detection, in accordance with the teachings of the present disclosure.

FIG. 5 illustrates a top view of an example image sensor 500 capable of generating a depth map for occlusion detection, in accordance with the teachings of the present disclosure. Accordingly, the image sensor 500 may be one possible implementation of the image sensor 105 illustrated in FIG. 1 and/or the image sensor 405 illustrated in FIG. 4 for performing any of the method 100 illustrated in FIG. 1, the method 200 illustrated in FIG. 2, and/or the reduced representations 303-A, 306-A, 309-A, 312-A, 315-A, 318-A, 321-A, 303-B, 306-B, 309-B, 312-B, 315-B, 318-B, 321-B illustrated in FIG. 3A and FIG. 3B. It is appreciated that the view presented in FIG. 5 may omit certain elements of image sensor 500 to avoid obscuring details of the disclosure. In other words, not all elements of image sensor 500 may be labeled, illustrated, or otherwise shown within FIG. 5. It is further appreciated that in some embodiments, image sensor 500 may not necessarily include all elements shown.

As illustrated in FIG. 5, image sensor 500 includes a shared microlens 537-S between multiple pixels (e.g., C1, C2, C3, and C4) of a pixel cell 502, in accordance with the teachings of the present disclosure. Image sensor 500 includes a plurality of photodiodes 513, each associated with a corresponding color filter included in the plurality of color filters 535 such as blue 535-B, green 535-G, red 535-R and clear or transparent 535-C arranged in rows and columns to form an array of pixels. It is appreciated that individual photodiodes included in the plurality of photodiodes 513 may be referred to based on their color filter association (e.g., B1, B2, B3, GB1, GB2, GB4, GR1, GR3, GR4, C1, C2, C3, C4, and so on). In some embodiments, the plurality of photodiodes 513 are arranged in a regular, repeating manner such that the plurality of photodiodes 513 are positioned within a semiconductor material at regular intervals to form a photodiode array with a square or rectangular shape via rows and columns of photodiodes. In some embodiments individual photodiodes included in the plurality of photodiodes 513 may correspond to doped regions within the respective portions of the semiconductor material that are collectively responsive to incident light (e.g., the doped regions may form a PN junction that generates image charge proportional to a magnitude or intensity of the incident light). It is appreciated that each of the plurality of photodiodes 513 are disposed in a semiconductor material and are optically aligned with the plurality of color filters 535 (e.g., 535-B corresponding to a blue color filter, 535-G corresponding to a green color filter, 535-R corresponding to a red color filter, and 535-C corresponding to a clear or transparent color filter) to form individual pixels (e.g., blue pixels 503, green pixels 504 and 505, and red pixels 506) or a phase detection pixel (e.g., 507) for a given pixel cell (e.g., 502).

It is appreciated that the pixel cell 502 is representative of any individual one of a plurality of pixel cells that may be included or otherwise collectively form the image sensor 500. In some embodiments, the pixel cell 502 may correspond to a minimal repeat unit of the image sensor 500 and be referred to as a full-color pixel (e.g., capable of generating image signals in response to incident light that may collectively represent at least the visible portion of the electromagnetic spectrum). Pixel cell 502 includes a phase detection pixel 507 that is surrounded by a plurality of color pixels (e.g., blue pixels 503, green pixels 504 and 505, and red pixels 506). The phase detection pixel 507 includes the shared microlens 537-S optically aligned with a group of neighboring photodiodes (e.g., photodiodes labeled as C1, C2, C3, and C4) included in the plurality of photodiodes 513. In some embodiments, the shared microlens 507 extends over approximately two rows and two columns included in the photodiode array, which may be utilized to generate phase information of the external scene to generate a depth map. In the illustrated embodiment, individual microlenses included in the plurality of individual microlenses 537-I are aligned with a corresponding one of the plurality of photodiodes 513 (e.g., B1, B2, B3, GB1, GB2, GB4, GR1, GR3, GR4, C1, C2, C3, C4, and soon). In other words, individual microlenses included in the plurality of microlenses 537-I extend over approximately one row and one column of the photodiode array. In some embodiments, individual microlenses included in the plurality of microlenses 537-I are unshared with respect to the plurality of photodiodes 513 and thus respectively direct light towards a single one of the plurality of photodiodes 513. In other embodiments, the phase detection pixel 507 may be omitted and one or more groups of the plurality of photodiodes 513 may be aligned with a shared microlens to provide both imaging and phase detection (e.g., a shared microlens may be optically aligned with one or more groups of the plurality of photodiodes 513). In such an embodiment, the corresponding color filter may be adjusted from clear to the appropriate color (e.g., C1 becomes B4, C2 becomes GB3, C3 becomes GR2, C4 becomes R3, and so on for each pixel cell).

It is appreciated that image sensor 500 may be fabricated by semiconductor device processing and microfabrication techniques known by one of ordinary skill in the art. In one embodiment, fabrication of image sensor 500 may include providing a semiconductor material (e.g., a silicon wafer having a front side and a back side), forming a mask or template (e.g., out of cured photoresist) on the front side of the semiconductor material via photolithography to provide a plurality of exposed regions of the front side of semiconductor material, doping (e.g., via ion implantation, chemical vapor deposition, physical vapor deposition, and the like) the exposed portions of the semiconductor material to form the plurality of photodiodes 513 that extend into semiconductor material from the front side of semiconductor material, removing the mask or template (e.g., by dissolving the cured photoresist with a solvent), and planarizing (e.g., via chemical mechanical planarization or polishing) the front side of semiconductor material. In the same or another embodiment, photolithography may be similarly used to form the plurality of color filters 535 and the plurality of microlenses 537 (e.g., individual or shared microlenses which may be polymer based microlenses having a target shape and size formed from a master mold or template). It is appreciated that the described techniques are merely demonstrative and not exhaustive and that other techniques may be utilized to fabricate one or more components of image sensor 500.

The processes explained above may be implemented using software and/or hardware. The techniques described may constitute machine-executable instructions embodied within a tangible or non-transitory machine (e.g., computer) readable storage medium, that when executed by a machine (e.g., controller 410 of FIG. 4) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging system, comprising:
    an image sensor including an array of pixels arranged in rows and columns to image an external scene; and
    a controller coupled to the image sensor, the controller including logic storing instructions that when executed by the controller causes the imaging system to perform operations comprising:
        capturing images of the external scene with the image sensor, the images including a first image and a second image;
        generating reduced representations of the images, wherein each one of the reduced representations has a corresponding resolution less than a full-size resolution of a respective one of the images, and wherein the reduced representations include a first reduced representation associated with the first image and a second reduced representation associated with the second image, wherein the reduced representations of the images include at least row profiles or column profiles of the images, wherein the row profiles correspond to average row intensities on a row-by-row basis based on the rows of the array of pixels for each of the images, and wherein the column profiles correspond to average column intensities on a column-by-column basis based on the columns of the array of pixels for each of the images; and
        comparing the first reduced representation with the second reduced representation to determine a difference between the first image and the second image; and
        identifying an occurrence of an occlusion affecting the image sensor imaging the external scene when the difference is greater than a threshold value.

2. The imaging system of claim 1, wherein the difference corresponds to a change in the average row intensities or the average column intensities between the first image and the second image.

3. The imaging system of claim 1, the logic storing additional instructions that when executed by the controller causes the imaging system to perform further operations comprising:
    identifying one or more regions of the image sensor affected by the occlusion based on a location where the difference between the first image and the second image is greater than the threshold value;
    monitoring corresponding regions of the images subsequent to the first image and the second image to determine whether the occlusion is stationary over a period of time, wherein the corresponding regions of the images are associated with the one or more regions of the image sensor identified as being affected by the occlusion; and
    verifying the occlusion is affecting the image sensor when the period of time the occlusion is stationary is greater than a temporal threshold.

4. The imaging system of claim 3, the logic storing additional instructions that when executed by the controller causes the imaging system to perform further operations comprising:
    generating a depth map associated with a third image included in the images, wherein the third image is temporally subsequent to the first image and the second image, wherein;
    determining a distance of the occlusion from the image sensor based on the depth map to further verify the occlusion is affecting the image sensor when the distance is less than a depth threshold.

5. The imaging system of claim 4, the logic storing additional instructions that when executed by the controller causes the imaging system to perform further operations comprising outputting a notification indicating, to a user of the imaging system, the presence of the occlusion affecting the image sensor.

6. The imaging system of claim 1, wherein the difference corresponds to an average intensity difference between the row profiles or the column profiles of the first image and the second image.

7. The imaging system of claim 1, wherein the logic corresponds to on-chip memory associated with the image sensor, and wherein the reduced representations of the images are stored in the on-chip memory to locally identify the occurrence of the occlusion without external memory or external processing.

8. The imaging system of claim 7, the logic storing additional instructions that when executed by the controller causes the imaging system to perform further operations comprising removing, from the on-chip memory, one or more of the images after a corresponding one of the reduced representations is stored in the on-chip memory.

9. The imaging system of claim 1, wherein the first image and the second image are consecutive image frames such that there is no intervening image frame between the first image and the second image.

10. The imaging system of claim 1, the logic storing additional instructions that when executed by the controller causes the imaging system to perform further operations comprising:
    calculating a corresponding row profile associated with each row included in the rows of the array of pixels for each of the images to generate the row profiles; or
    calculating a corresponding column profile associated with each column included in the columns of the array of pixels for each of the images to generate the column profiles.

11. An imaging system, comprising:
    an image sensor including an array of pixels arranged in rows and columns to image an external scene; and
    a controller coupled to the image sensor, the controller including logic storing instructions that when executed by the controller causes the imaging system to perform operations comprising:

capturing images of the external scene with the image sensor, the images including a first image and a second image;

generating reduced representations of the images, wherein each one of the reduced representations has a corresponding resolution less than a full-size resolution of a respective one of the images, and wherein the reduced representations include a first reduced representation associated with the first image and a second reduced representation associated with the second image;

comparing the first reduced representation with the second reduced representation to determine a difference between the first image and the second image; and identifying an occurrence of an occlusion affecting the image sensor imaging the external scene when the difference is greater than a threshold value;

generating a depth map associated with a third image included in the images, wherein the third image is temporally subsequent to the first image and the second image; and determining a distance of the occlusion from the image sensor based on the depth map to verify the occlusion is affecting the image sensor when the distance is less than a depth threshold.

12. The imaging system of claim 11, the logic storing additional instructions that when executed by the controller causes the imaging system to perform further operations comprising outputting a notification indicating, to a user of the imaging system, the presence of the occlusion affecting the image sensor.

13. At least one non-transitory machine-accessible storage medium that provides instructions that, when executed by a machine, will cause the machine to perform operations for occlusion detection, the operations comprising:

receiving images of an external scene, the images including a first image and a second image, wherein the images are defined by an array of pixels arranged in rows and columns;

generating reduced representations of the images, wherein each one of the reduced representations has a corresponding resolution less than a full-size resolution of a respective one of the images, and wherein the reduced representations include a first reduced representation associated with the first image and a second reduced representation associated with the second image, wherein the reduced representations of the images include at least row profiles or column profiles of the images, wherein the row profiles correspond to average row intensities on a row-by-row basis based on the rows of the array of pixels for each of the images, wherein the column profiles correspond to average column intensities on a column-by-column basis based on the columns of the array of pixels for each of the images; and comparing the first reduced representation with the second reduced representation to determine a difference between the first image and the second image; and identifying an occurrence of an occlusion affecting imaging of the external scene when the difference is greater than a threshold value.

14. The at least one non-transitory machine-accessible storage medium of claim 13, wherein the machine corresponds to an image sensor coupled to a controller, and wherein the at least one non-transitory machine-accessible storage medium corresponds to on-chip memory of the machine to locally identify the occurrence of the occlusion without external memory or external processing.

15. The at least one non-transitory machine-accessible storage medium of claim 13, wherein the difference corresponds to a change in the average row intensities or the average column intensities between the first image and the second image.

16. The at least one non-transitory machine-accessible storage medium of claim 13, that provides additional instructions that, when executed by the machine, will cause the machine to perform further operations comprising:

identifying one or more regions of the image sensor affected by the occlusion based on a location where the difference between the first image and the second image is greater than the threshold value;

monitoring corresponding regions of the images subsequent to the first image and the second image to determine whether the occlusion is stationary over a period of time, wherein the corresponding regions of the images are associated with the one or more regions of the image sensor identified as being affected by the occlusion; and verifying the occlusion is affecting the image sensor when the period of time the occlusion is stationary is greater than a temporal threshold.

17. The at least one non-transitory machine-accessible storage medium of claim 13, that provides additional instructions that, when executed by the machine, will cause the machine to perform further operations comprising:

generating a depth map associated with a third image included in the images, wherein the third image is temporally subsequent to the first image and the second image; and determining a distance of the occlusion from the image sensor based on the depth map to further verify the occlusion is affecting the image sensor when the distance is less than a depth threshold.

18. The at least one non-transitory machine-accessible storage medium of claim 17, that provides additional instructions that, when executed by the machine, will cause the machine to perform further operations comprising outputting a notification indicating, to a user of the imaging system, the presence of the occlusion affecting the image sensor.

19. The at least one non-transitory machine-accessible storage medium of claim 13, that provides additional instructions that, when executed by the machine, will cause the machine to perform further operations comprising:

calculating a corresponding row profile associated with each row included in the rows of the array of pixels for each of the images to generate the row profiles; or calculating a corresponding column profile associated with each column included in the columns of the array of pixels for each of the images to generate the column profiles.

20. At least one non-transitory machine-accessible storage medium that provides instructions that, when executed by a machine, will cause the machine to perform operations for occlusion detection, the operations comprising:

receiving images of an external scene with an image sensor, the images including a first image and a second image;

generating reduced representations of the images, wherein each one of the reduced representations has a corresponding resolution less than a full-size resolution of a respective one of the images, and wherein the reduced representations include a first reduced representation associated with the first image and a second reduced representation associated with the second image; and comparing the first reduced representation with the second reduced representation to determine a difference between the first image and the second image;

identifying an occurrence of an occlusion affecting imaging of the external scene by the image sensor when the difference is greater than a threshold value;

generating a depth map associated with a third image included in the images, wherein the third image is temporally subsequent to the first image and the second image; and determining a distance of the occlusion from the image sensor based on the depth map to verify the occlusion is affecting the image sensor when the distance is less than a depth threshold.

* * * * *